(12) United States Patent
McMillian et al.

(10) Patent No.: US 8,190,699 B2
(45) Date of Patent: May 29, 2012

(54) SYSTEM AND METHOD OF MULTI-PATH DATA COMMUNICATIONS

(75) Inventors: Brett McMillian, Austin, TX (US); Gary McMillian, Austin, TX (US); Dennis Ferguson, Austin, TX (US)

(73) Assignee: Crossfield Technology LLC, Austin, TX (US)

( * ) Notice: Subject to any disclaimer, the term of this patent is extended or adjusted under 35 U.S.C. 154(b) by 14 days.

(21) Appl. No.: 12/180,631

(22) Filed: Jul. 28, 2008

(65) Prior Publication Data

US 2010/0023595 A1 Jan. 28, 2010

(51) Int. Cl.
*G06F 15/167* (2006.01)
*G06F 3/00* (2006.01)
*H04B 3/30* (2006.01)
*H04L 12/28* (2006.01)
*H04L 12/56* (2006.01)

(52) U.S. Cl. .......... 709/212; 370/285; 370/401; 710/20; 710/30

(58) Field of Classification Search .................... 709/212
See application file for complete search history.

(56) References Cited

U.S. PATENT DOCUMENTS

| | | | |
|---|---|---|---|
| 4,471,427 A | 9/1984 | Harris | 364/200 |
| 5,452,291 A | 9/1995 | Eisenhandler et al. | 370/54 |
| 5,701,516 A | 12/1997 | Cheng et al. | 395/842 |
| 5,752,068 A | 5/1998 | Gilbert | 395/800.16 |
| 5,774,698 A * | 6/1998 | Olnowich | 712/1 |
| 6,426,952 B1 * | 7/2002 | Francis et al. | 370/380 |
| 6,430,634 B1 * | 8/2002 | Mito | 710/100 |
| 6,742,017 B1 * | 5/2004 | Black et al. | 709/211 |
| 6,745,310 B2 | 6/2004 | Chow et al. | 711/170 |
| 6,792,513 B2 | 9/2004 | Bade et al. | 711/147 |
| 6,810,442 B1 | 10/2004 | Lin et al. | 710/22 |
| 6,901,072 B1 * | 5/2005 | Wong | 370/389 |
| 6,941,424 B2 | 9/2005 | Bade et al. | 711/147 |
| 7,010,607 B1 * | 3/2006 | Bunton | 709/228 |
| 7,382,790 B2 * | 6/2008 | Warren et al. | 370/401 |
| 7,664,110 B1 * | 2/2010 | Lovett et al. | 370/392 |
| 2002/0018470 A1 | 2/2002 | Galicki et al. | 370/392 |
| 2002/0069334 A1 | 6/2002 | Hsia et al. | 711/147 |
| 2002/0069337 A1 | 6/2002 | Hsia et al. | 711/168 |
| 2002/0099879 A1 | 7/2002 | Bayer et al. | 710/22 |
| 2002/0161848 A1 * | 10/2002 | Willman et al. | 709/213 |
| 2003/0167348 A1 * | 9/2003 | Greenblat | 709/251 |
| 2003/0188100 A1 * | 10/2003 | Solomon et al. | 711/114 |
| 2004/0009345 A1 | 1/2004 | Hummel | 428/332 |
| 2004/0103218 A1 * | 5/2004 | Blumrich et al. | 709/249 |
| 2005/0005036 A1 | 1/2005 | Bade et al. | 710/22 |
| 2005/0038949 A1 | 2/2005 | Patterson et al. | 710/315 |
| 2006/0259671 A1 | 11/2006 | Swartzentruber et al. | 710/104 |
| 2007/0033511 A1 * | 2/2007 | Davies | 714/799 |
| 2007/0067481 A1 * | 3/2007 | Sharma et al. | 709/231 |
| 2007/0078267 A1 | 4/2007 | Dotz et al. | 549/59 |

(Continued)

*Primary Examiner* — Ario Etienne
*Assistant Examiner* — Blake Rubin
(74) *Attorney, Agent, or Firm* — Cesari & Reed, LLP; R. Michael Reed

(57) ABSTRACT

In a particular embodiment, a multi-path bridge circuit includes a backplane input/output (I/O) interface to couple to a local backplane having at least one communication path to a processing node and includes at least one host interface adapted to couple to a corresponding at least one processor. The multi-path bridge circuit further includes logic adapted to identify two or more communication paths through the backplane interface to a destination memory, to divide a data block stored at a source memory into data block portions, and to transfer the data block portions in parallel from the source memory to the destination node via the identified two or more communication paths.

27 Claims, 10 Drawing Sheets

U.S. PATENT DOCUMENTS

| | | | |
|---|---|---|---|
| 2007/0079017 A1 | 4/2007 | Brink et al. | 710/22 |
| 2007/0118677 A1* | 5/2007 | Swartzentruber et al. | 710/316 |
| 2007/0124532 A1 | 5/2007 | Bennett | 710/22 |
| 2008/0052436 A1* | 2/2008 | Sharma et al. | 710/301 |
| 2008/0082790 A1 | 4/2008 | Diyankov et al. | 712/207 |
| 2009/0006808 A1* | 1/2009 | Blumrich et al. | 712/12 |
| 2009/0063747 A1* | 3/2009 | Bagepalli et al. | 710/313 |
| 2009/0094436 A1* | 4/2009 | Deng et al. | 712/11 |

* cited by examiner

SYSTEM AND METHOD OF MULTI-PATH DATA COMMUNICATIONS

GOVERNMENT LICENSE RIGHTS

The U.S. Government has a paid-up license in this invention and the right in limited circumstances to require the patent owner to license others on reasonable "terms as provided for by the terms of government contract W9113M06C0163 awarded by the U.S. Army Space and Missile Defense Command of Huntsville, Ala.

FIELD OF THE DISCLOSURE

The present disclosure is generally related to systems and methods of multi-path data communications.

BACKGROUND

In general, data communications between multiple processors of an electronic device or between electronic devices occurs via a communications path, which may be a wired or wireless communications path. Such data transfers can occur according to a data communications protocol, such as an Ethernet protocol. To transfer data efficiently, a number of techniques have been implemented that allow for direct data transfers. One example includes a Remote Direct Memory Access (RDMA) technique for transferring data directly from a memory of one computing device to a memory of another computing device with limited involvement of the operating systems of either of the computing devices. RDMA permits high-throughput, low-latency networking, which can be used in parallel computer clusters. In general, an electronic device that supports RDMA may include an input DMA and an output DMA to receive data from and send data to other devices.

Typically, when a transmitting device wants to send data to a destination device that has an input DMA, the transmitting device sends a request to the input DMA of the destination device. The input DMA of the destination device can then send an Acknowledgement (ACK) to the transmitting device. When the transmitting device receives the ACK, it transfers data to the input DMA of the destination device, and the input DMA transfers the data into memory with limited involvement of the operating system of the destination device.

In general, the RDMA Consortium defined a suite of protocols at the transport layer that enables cooperating DMA engines at each end of a communication path to move data between memory locations with minimal support from the kernel, and with "zero copy" to intermediate buffers. The RDMA Consortium's specifications are now maintained by the Internet Engineering Task Force (IETF). A Remote Direct Memory Access Protocol (RDMAP) Verbs specification describes the behavior of the protocol off-load hardware and software, defines the semantics of the RDMA services, and specifies how the hardware and software appear to the host software, including both the user and kernel Application Programming Interface (API). The Verbs specification defines an RDMA READ/WRITE operation and a SEND operation that transport data between user space memories or into a receive queue, respectively. Further, the Verbs specification defines Send and Receive Queues (SQ and RQ) and queue pairs to control data transport and Completion Queues (CQs) to signal when an operation is complete. Work Requests (WRs) are converted into Work Queue Elements (WQEs), which are processed in turn by the off-load engine. An asynchronous event (interrupt) is generated when work is complete. Also, data need not be in contiguous memory at either the source or destination, as Scatter Gather Lists (SGLs) can define the physical memory locations of data segments.

In such RDMA transfers, the CPUs, caches, and/or context switches are not used, allowing data transfers to continue in parallel with other system operations. When a processor performs a RDMA read or write request, the application data is delivered directly to the network, reducing latency and enabling fast message transfer. Thus, RDMA permits high-throughput, low-latency networking, which is especially useful in massively parallel computer clusters. RDMA can reduce operating system overhead associated with networking, which can squeeze out the capacity to move data across a network, reducing performance, limiting how fast an application can get the data it needs, and restricting the size and scalability of a cluster.

Unfortunately, conventional systems, including complex simulation systems having multiple processors, struggle to generate, process, and render realistic multi-spectral and hyperspectral graphics in real-time, to perform complex modeling calculations, to acquire real-time data, or any combination thereof. While RDMA can be used to leverage processing capabilities associated with multiple processors, network data transfer throughput rates can offset processing gains. Hence, there is a need for systems and methods to enhance data transfer throughput in multi-processor systems.

SUMMARY

In a particular embodiment, a multi-path bridge circuit includes a backplane input/output (I/O) interface to couple to a local backplane having at least one communication path to a processing node and includes at least one host interface adapted to couple to a corresponding at least one processor. The multi-path bridge circuit further includes logic adapted to identify two or more communication paths through the backplane interface to a destination memory, to divide a data block stored at a source memory into data block portions, and to transfer the data block portions in parallel from the source memory to the destination node via the identified two or more communication paths.

In another particular embodiment, a circuit device includes a local backplane including multiple communication paths and a plurality of multi-path bridge circuits communicatively interconnected via the multiple communication paths through the local backplane. Each multi-path bridge circuit of the plurality of multi-path bridge circuits is adapted to utilize available communication paths through the local backplane to transfer data in parallel from a source to a destination.

In still another particular embodiment, a method is disclosed that includes identifying available communication paths from a source to a destination via a local backplane and via a network fabric using a multi-path bridge circuit associated with the source. The method further includes segmenting a data block stored at a source memory of the source into multiple data block portions corresponding to a number of identified available communication paths using the multi-path bridge circuit and concurrently transferring the multiple data block portions from the source memory to a destination memory at the destination via the identified available paths.

DETAILED DESCRIPTION OF ILLUSTRATIVE EMBODIMENTS

In general, a multi-path bridge circuit is disclosed that includes logic to exploit multiple communication paths through a local backplane and optionally through a network fabric to transfer data from a source to a destination concurrently via the multiple communication paths, achieving an order-of-magnitude increase in bandwidth in data transfer throughput. In a particular example, a plurality of multi-path bridge circuits can be included in a circuit device to exploit the multiple communication paths through the local backplane to transfer data at a data throughput rate that is related to an aggregate of the data rates associated with the available communication paths. In a particular example, the multi-path bridge circuits can be used to facilitate data transfers between a source node and a destination node of the same device. In another particular example, the multi-path bridge circuits can be used to transfer data between instrumentation systems and supercomputing clusters via a local backplane or through a network fabric to allow data processing in real-time or near real-time, even among geographically distributed processing devices.

Figure 1:
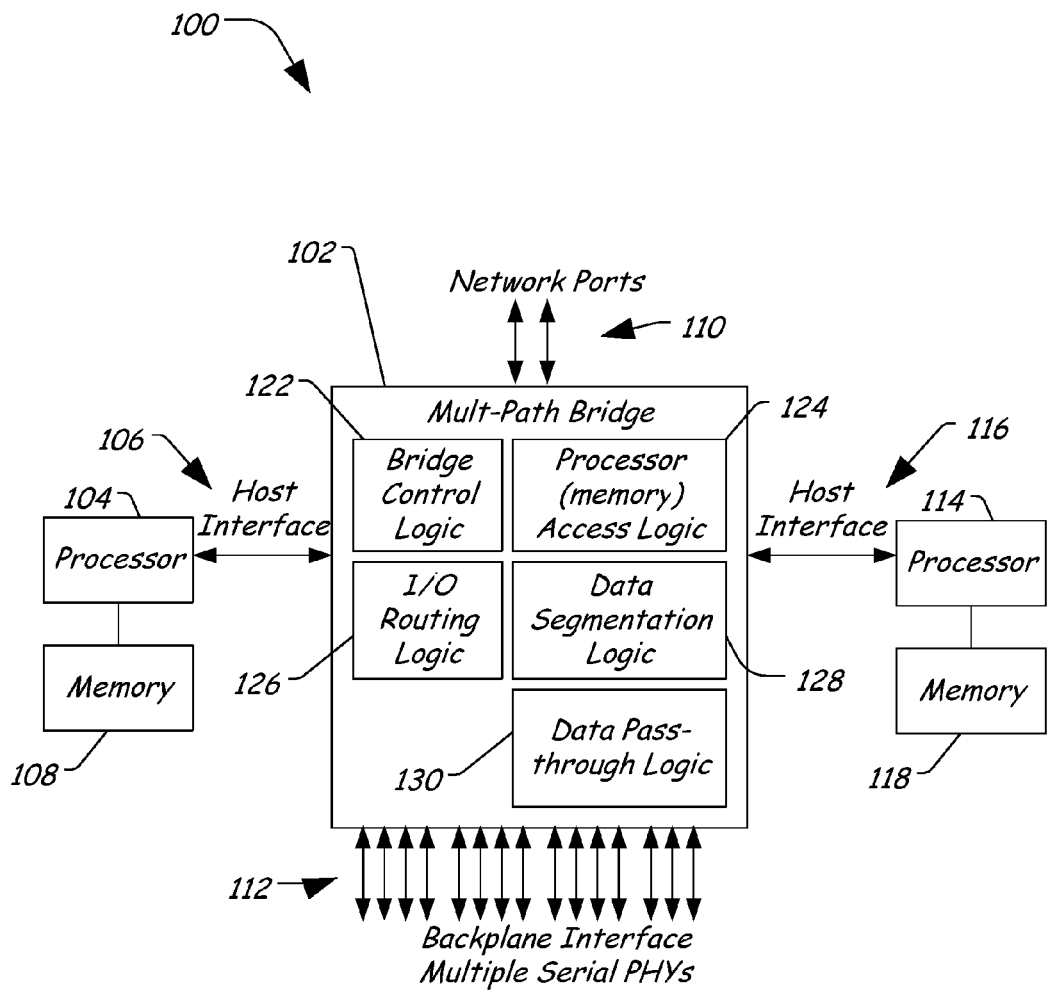
FIG. 1 is a block diagram of a particular illustrative embodiment of a multi-path bridge to provide multi-path data communications.

FIG. 1 is a block diagram of a particular illustrative embodiment of a multi-path bridge system 100 to provide multi-path data communications. The multi-path bridge system 100 includes a multi-path bridge circuit 102 including media dependent input/output (I/O) interfaces 110, such as Ethernet I/O interfaces, adapted to couple to a media dependent network fabric via a corresponding pair of cables (not shown). In a particular example, the network may be an Ethernet network that is coupled to the media dependent I/O interfaces 110 via Ethernet cables. Additionally, the multi-path bridge 102 includes a backplane I/O interface 112 that is adapted to couple to a local backplane. In a particular example, the local backplane can be a "full-mesh" bridge that provides direct connections between multiple multi-channel bridge circuits.

The multi-path bridge circuit 102 further includes a first host interface 106 coupled to a first processor 104 having a first memory 108. In a particular embodiment, the multi-path bridge circuit 102 can be integrated with a processor, such as the first processor 104. The multi-path bridge circuit 102 may include a second host interface 116 coupled to a second processor 114 having a second memory 118. In a particular embodiment, the first and second host interfaces 106 and 116 may be 32-lane low voltage differential signal (LVDS) interfaces to communicate data. In general, the first and second host interfaces 106 and 116 can include any high-speed, chip-to-chip interconnect technology, including AMD's Hyper-Transport™ (HT) technology, Intel's QuickPath Interconnect (QPI) technology, Rambus' FlexIO™ technology (which is currently used in the IBM, Sony, and Toshiba Cell Broadband Engine), other future interconnect technologies, or any combination thereof. In a particular embodiment, the first and second processors 104 and 114 can be field programmable gate array (FPGA) circuits.

The multi-path bridge circuit 102 includes bridge control logic 122 that is adapted to control operation of the multi-path bridge circuit 102. Further, the multi-path bridge circuit 102 includes processor (memory) access logic 124 that can be used to directly access a memory location associated with one of the first memory 108, the second memory 118, or other memories accessible via the media dependent I/O interfaces 110 or the backplane I/O interfaces 112. Further, the multi-path bridge circuit 102 includes I/O routing logic 126 that is adapted to determine which input/output interfaces of the media dependent I/O interfaces 110 and the backplane I/O interfaces 112 have available routes for data transfer to a selected destination. In a particular example, the destination can be an application or a process executing on a processor, a destination memory, a destination device, a destination processing node, or any combination thereof. Additionally, the multi-path bridge circuit 102 includes data segmentation logic 128 that can be used to divide a particular data block into multiple data block portions, which can be transferred from the source to the destination via the identified I/O interfaces. Further, the multi-path bridge circuit 102 includes data cut-through (bypass or pass-through) logic 130 that is adapted to allow data to pass from the backplane I/O interface 112 to the media dependent I/O interface 110 (or vice versa) or between different channels in the local backplane 112 without interacting with one of the first or second processors 104 or 114, when a destination address associated with a received data block portion is related to a different processing node.

In a particular embodiment, the multi-path bridge circuit 102 can be implemented as an integrated circuit to provide a multi-path data communications to provide an order-of-magnitude increase in bandwidth (or data throughput capacity) between computing nodes. In a particular example, the multi-path bridge circuit 102 provides a remote direct memory access (RDMA) functionality. In an example, the multi-path bridge circuit 102 can be used to transfer portions of a data block concurrently via multiple data paths through the backplane I/O interface 112 and through the local backplane and/or via the media dependent I/O interface 110 to support low-latency data transfers. In a particular example, such concurrent data transfers can be used to support real-time or near-real-time parallel processing in systems that include multiple processing and/or instrumentation nodes. In a particular example, the multi-path bridge circuit 102 is adapted to allow for multi-path concurrent data transfers between multiple processing nodes and multi-Giga-sample per second (GSPS) instrumentation systems to allow for real-time or near real-time processing of measurement data.

In a particular illustrative example, the local backplane is adapted to support 10 Gigabit per second (Gbps) data transfer rates, which rates are fully supported by the backplane I/O interface 112. In a circuit device having sixteen processing nodes and having sixteen multi-path bridge circuits, fifteen multi-path bridge circuits plus the multi-path bridge circuit 102, a particular embodiment of the multi-path bridge circuit 102 has a 10 Gbps connection to each of the other processing nodes through the local backplane. By transferring portions of a data block in parallel via the backplane I/O interface 112, the multi-path bridge circuit 102 can exploit the multiple data paths through the local backplane to achieve an aggregated data throughput that is approximately 150 Gbps to transfer data from one memory to another memory within the circuit device. If the two media dependent I/O interfaces 110 have data throughput rates of 10 Gbps and are also exploited, the data throughput can reach approximately 170 Gbps.

Further, a similar concept can be employed to exploit the dual media dependent I/O interfaces 110 of the multi-path bridge circuit 102 and of the other fifteen multi-path bridge circuits to transfer the multiple data block portions to a destination memory of a remote device via the media dependent interface. For example, in a particular embodiment, a circuit device includes sixteen multi-path bridge circuits, such as the multi-path bridge circuit 102. In this example, the circuit device communicates with a corresponding circuit device via dual redundant switches, where the corresponding circuit device includes a corresponding sixteen multi-path bridge chips.

In a particular embodiment, the multi-path bridge circuit 102 is adapted to use the fifteen channels through the backplane I/O interface 112 and the two media dependent I/O interfaces 110 to provide the equivalent of seventeen 10 Gbps serial connections in parallel. In this example, if the data throughput of each of the media dependent interface connections is 10 Gbps, the local backplane and each of the media dependent connections can be exploited to transfer data from the first circuit device to a destination memory at the second circuit device at an aggregated throughput of approximately 170 Gbps (fifteen communication paths through the local backplane plus two communication paths through the network).

In general, both the Advanced Telecom Computing Architecture (AdvancedTCA®) and VITA Standards Organization (VITA 46/48) standards currently define full-mesh backplanes, which support up to 16 slots with fifteen channels per slot, allowing each of sixteen (16) processing nodes to be interconnected. Currently, each channel of the backplane I/O interface 112 supports bi-directional 10G Ethernet communications, using a 10 Gigabit physical layer, such as IEEE 802.3ap 10GBASE-KR. In this particular example, each slot operates at a maximum of approximately 150 Gbps of bandwidth in both directions through the local backplane. In general, the backplane I/O interface 112 is illustrated as supporting fifteen channels, which is consistent with a conventional, off-the-shelf local backplane architecture. However, it should be understood that the multi-path bridge 102 can be used with a backplane I/O interface 112 that supports any number of channels and/or any number of processors per node. Further, while the above-examples have used 10 Gbps as a transfer speed, it should be understood that the multi-path bridge circuit 102 can be adapted to operate at other data rates to fully exploit the data throughput rates of available local backplanes and of available media dependent switch fabric. Since the multi-path bridge circuit 102 is coupled to two processing nodes via the first and second (dual) host interfaces 106 and 116, the multi-path bridge circuit 102 allows the two processors that are connected via host interfaces 106 and 116 to share the full 150 Gigabits per second through the backplane I/O interface 112. While the above-example includes dual host interfaces 106 and 116 to couple to two processors, in a particular example, the multi-path bridge circuit 102 can be coupled to any number of processors via respective host interfaces.

In a particular example, the bridge control logic 122 can be instructions executed at a processor coupled to the multi-path bridge circuit 102 via one of the first or second interfaces 106 and 116. In a particular embodiment, a processor (or the bridge control logic 122) uses each of these seventeen 10 Gbps connections to transfer data directly from an associated memory to another processor's memory on any other processing node in a multi-node device via Remote Direct Memory Access (RDMA). Further, the multi-path bridge circuit 102 can use these seventeen 10 Gbps connections to transfer portions of a data block from its memory to each other processor's memory in a multi-node device via RDMA and to transfer the portions to a remote device via the media-dependent I/O interface 110 associated with the multi-path bridge 102 and with multi-path bridge circuits associated with other processing nodes of the circuit device having multiple processing nodes to achieve high data throughput via a network fabric.

While FIG. 1 is described as providing a multi-path remote direct memory access (RDMA), it should be understood that RDMA operates over a direct data placement (DDP) protocol layer. In a particular example, it is possible to utilize DDP without using RDMA. In a particular embodiment, the multi-path data transfer can be performed using RDMA, DDP, another protocol (proprietary or industry standard), or any combination thereof.

Figure 2:
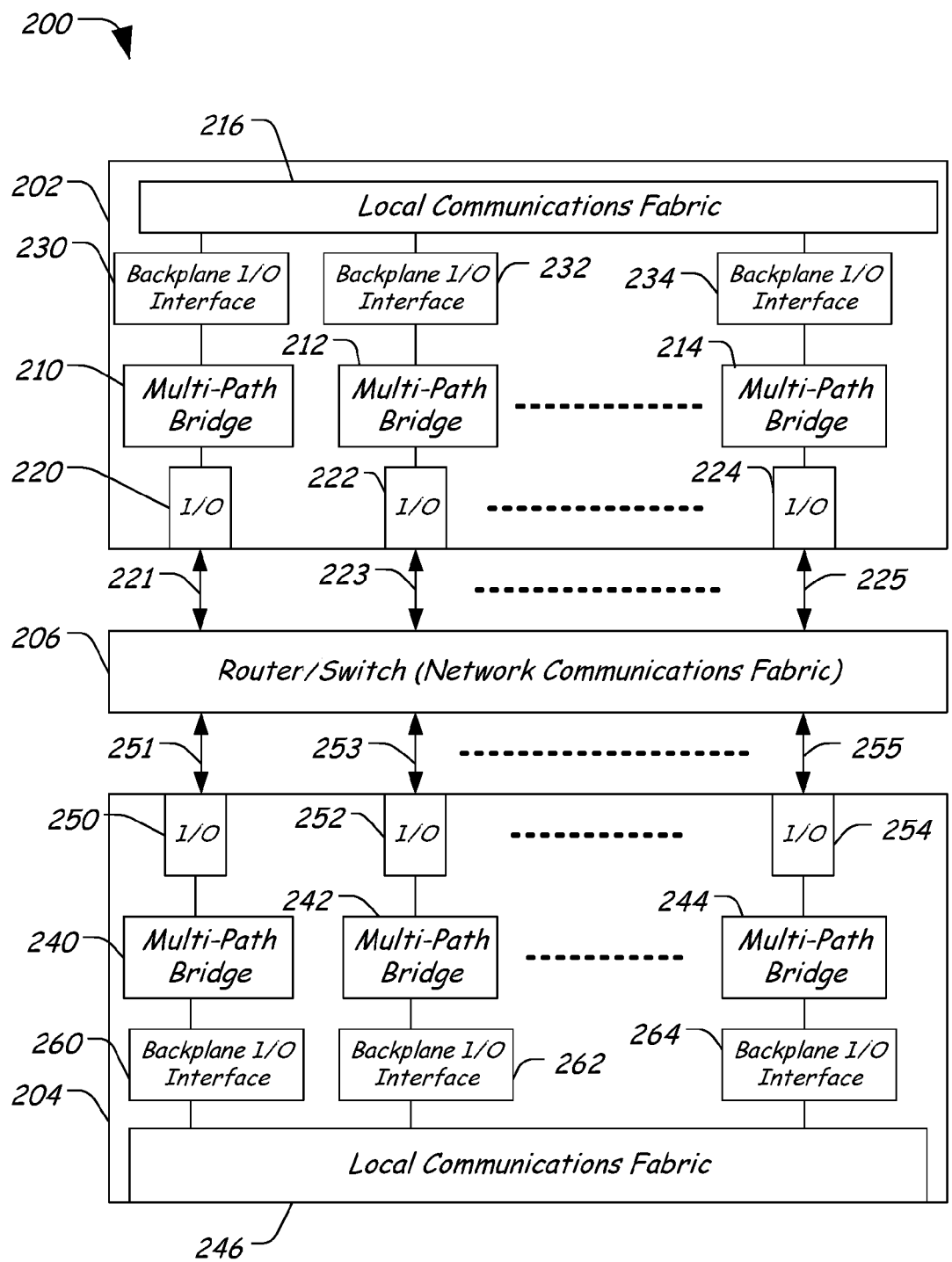
FIG. 2 is a block diagram of a particular illustrative embodiment of a system including servers having multiple multi-path bridges to provide multi-path data communications.

FIG. 2 is a block diagram of a particular illustrative embodiment of a system 200 having multiple multi-path bridges to provide multi-path data communication. The system 200 includes a first server 202 that communicates with a second server 204 via a network switch fabric (e.g., a network router/switch or other network device) 206. The first server 202 includes multiple processing nodes having multi-path bridge circuits 210, 212, and 214 that are coupled to a local communications fabric 216, such as a multi-path or full-mesh local backplane, via backplane I/O interfaces 230, 232 and 324. The multi-path bridge circuits 210, 212, and 214 are coupled to the network switch fabric 206 via respective input/output (I/O) interfaces 220, 222 and 224. Further, each of the multi-path bridge circuits 210, 212, and 214 may be coupled to one or more processors and associated memories. The respective I/O interfaces 220, 222 and 224 are coupled to the network switch fabric 206 via communication paths 221, 223, and 225, respectively. It should be understood that the first server 202 can include any number of processing nodes with processors, associated memories and an associated multi-path bridge chip, which processing nodes are fully interconnected via the local communications fabric 216.

The second server 204 includes multiple processing nodes having multi-path bridge circuits 240, 242, and 244 that are coupled to a local communications fabric 246, such as a multi-path or full-mesh local backplane, via backplane I/O interfaces 260, 262, and 264. The multi-path bridge circuits 240, 242, and 244 are coupled to the network switch fabric 206 via respective input/output (I/O) interfaces 250, 252 and 254. Further, each of the multi-path bridge circuits 240, 242, and 244 can be coupled to one or more processors and associated memories. The respective I/O interfaces 250, 252 and 254 are coupled to the network switch fabric 206 via communication paths 251, 253, and 255, respectively. It should be understood that the second server 204 can include any number of processing nodes with processors, associated memories and an associated multi-path bridge chip, which processing nodes are fully interconnected via the local communications fabric 246.

In a particular embodiment, each of the multi-path bridge chips 210, 212, 214, 240, 242, and 244 include logic to transfer data from a source memory to a destination memory via multiple available communication paths through the network switch fabric 206 and through the local communication fabrics 216 and 246. In a particular example, the multi-path bridge circuit 210 can transfer portions of a data block to a memory associated with the multi-path bridge circuit 214 via multiple communication paths concurrently. A first portion can be sent directly from the multi-path bridge circuit 210 to the multi-path bridge circuit 214 via a first communication path through the local communications fabric 216. A second portion can be sent directly from the multi-path bridge circuit 210 to the multi-path bridge circuit 212 through the local communications fabric 216. The multi-path bridge circuit 212 forwards the data via another direct communications path between the multi-path bridge circuit 212 and the multi-path bridge circuit 214 via the local communications fabric 216. In a particular example, the multi-path bridge circuit 210 uses all available communications paths through the local communications fabric 216 to forward portions of a data block to a memory associated with the multi-path bridge circuit 214, exploiting the multi-path bridge fabric 216 to transfer portions of the data concurrently. Further, one or more portions may be sent to the memory associated with the multi-path bridge 214 via the network I/O interface 220, the network switch fabric 206, and the network I/O interface 224. By utilizing available communications paths, data throughput can be enhanced by an order of magnitude.

In another particular example, using the local communications fabric 216, a data block to be transferred from a memory associated with the multi-path bridge 210 to a destination memory associated with the multi-path bridge 244 can be split up, forwarded to the other multi-path bridges 212 and 214, and sent via the network I/O interfaces 220, 222, and 224 concurrently to the multi-path bridges 240, 242, and 244. The multi-path bridges 240 and 242 forward received data portions to the destination memory of the multi-path bridge 244 via the local communications fabric 246. Thus, data transfers across the network switch fabric 206 can also be enhanced to provide greater throughput.

In a particular example, the multi-path bridge circuit 210 includes logic adapted to segment or divide a data block into a number of portions related to a number of available I/O paths. In another particular embodiment, the logic is adapted to transmit duplicate portions of the data block via selected paths of the available I/O paths to provide data redundancy as well as enhanced data throughput. In a high quality of service (QoS) implementation, the data portions may be sent concurrently and redundantly via multiple available paths to ensure a high quality data transmission.

Figure 3:
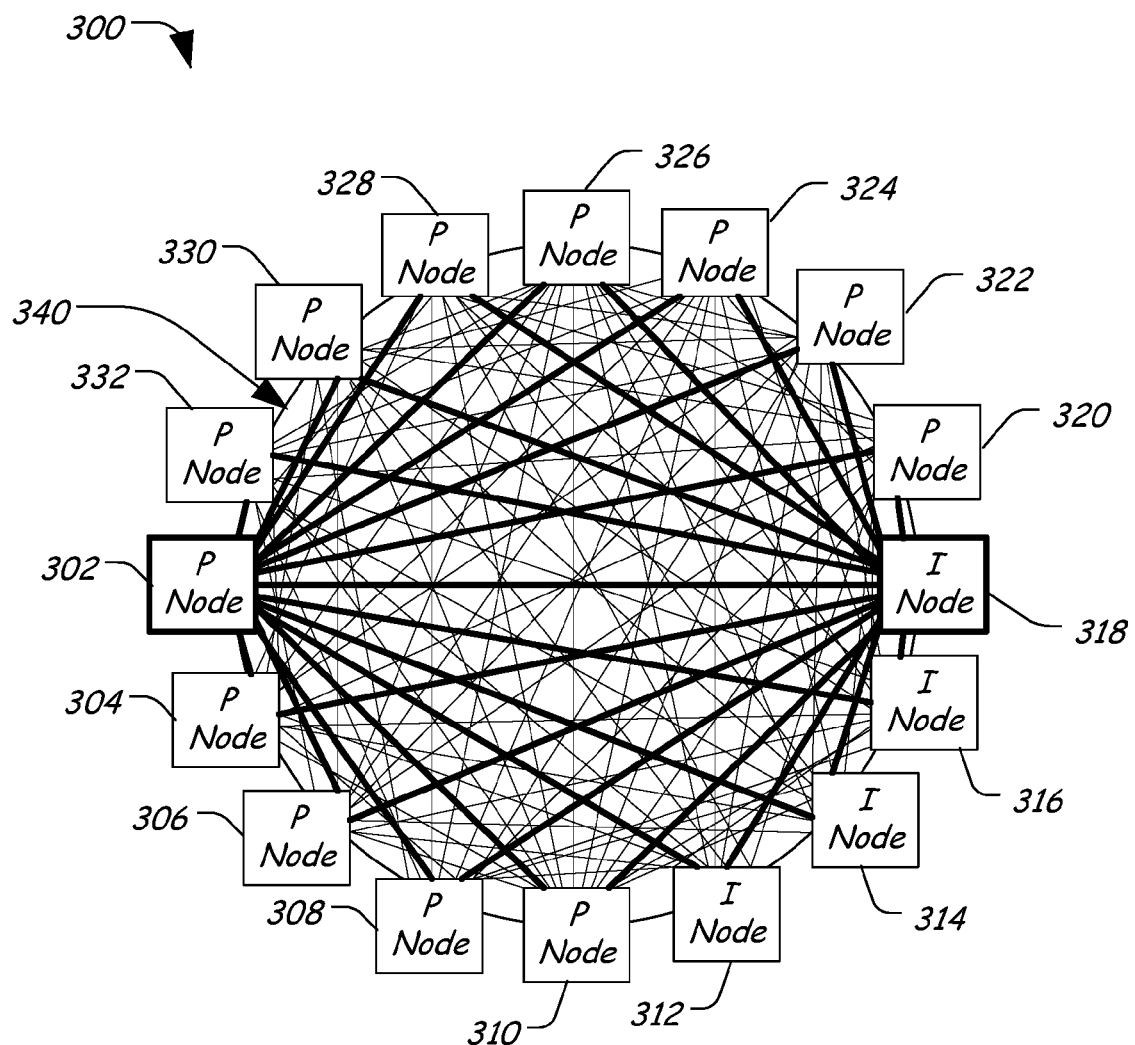
FIG. 3 is a block diagram of a particular illustrative embodiment of a circuit device including a plurality of processing nodes coupled by a full-mesh backplane, each processing node including a multi-path bridge, such as the multi-path bridge illustrated in FIG. 1, to provide multi-path data communications.

FIG. 3 is a block diagram of a particular illustrative embodiment of a circuit device 300 including a plurality of processing nodes 302, 304, 306, 308, 310, 312, 314, 316, 318, 320, 322, 324, 326, 328, 330, and 332 coupled by a multi-path backplane 340. Each of the plurality of processing nodes 302, 304, 306, 308, 310, 312, 314, 316, 318, 320, 322, 324, 326, 328, 330, and 332 includes a multi-path bridge circuit, such as the multi-path bridge circuit 102 illustrated in FIG. 1, to provide multi-path data communications via the multi-path backplane 340. In particular, the plurality of processing nodes 302, 304, 306, 308, 310, 312, 314, 316, 318, 320, 322, 324, 326, 328, 330, and 332 are directly interconnected with one another via a multi-path local backplane 340. In a particular embodiment, the each of the plurality of processing nodes 302, 304, 306, 308, 310, 312, 314, 316, 318, 320, 322, 324, 326, 328, 330, and 332 includes 15 channel connections to the multi-path local backplane 340. In a particular example, the multi-path local backplane 340 incorporates a full-mesh network topology into a passive backplane, or mid-plane, in which case every processing node 302, 304, 306, 308, 310, 312, 314, 316, 318, 320, 322, 324, 326, 328, 330, and 332 has a direct connection to every other processing node.

In a particular example, each channel supports bi-directional 10G Ethernet communications, using a 10GBASE-KR physical layer. In this particular example, each of the plurality of processing nodes 302, 304, 306, 308, 310, 312, 314, 316, 318, 320, 322, 324, 326, 328, 330, and 332 can operate at a maximum of approximately 150 Gbps of bandwidth in both directions through the multi-path local backplane 340.

The multi-path bridge circuit of each of the processing nodes 302, 304, 306, 308, 310, 312, 314, 316, 318, 320, 322, 324, 326, 328, 330, and 332 provides a bridge between a host processor interface and each of the plurality of processing nodes 302, 304, 306, 308, 310, 312, 314, 316, 318, 320, 322, 324, 326, 328, 330, and 332 via the multi-path local backplane 340. Further, the multi-path bridge circuit of each of the processing nodes 302, 304, 306, 308, 310, 312, 314, 316, 318, 320, 322, 324, 326, 328, 330, and 332 provides a bridge between the multi-path local backplane 340 and a network fabric, such as the network switch fabric 206 illustrated in FIG. 2.

In a particular example, the system 300 includes processing nodes (P-nodes) 302, 304, 306, 308, 310, 320, 322, 324, 326, 328, 330, and 332 and includes instrumentation nodes (I-nodes) 312, 314, 316, and 318. The instrumentation nodes 312, 314, 316, and 318 couple to the multi-path local backplane 340 to support multi-Giga-sample per second (GSPS) instrumentation, which allows for real-time or near-real-time parallel processing of data produced by multi-GSPS instrumentation. In a particular example, the system 300 can include multiple Giga-sample per second (GSPS) data acquisition devices (instrumentation nodes) that are interconnected with the plurality of processing nodes 302, 304, 306, 308, 310, 320, 322, 324, 326, 328, 330, and 332 via the multi-path local backplane 340 to provide, for example, hardware-in-the-loop simulation, signal processing, and spectrum analysis. The system 300 is adapted to utilize available backplane technologies, such as 10 Gigabit per second Remote Direct Memory Access (RDMA) over IP and multi-path local backplanes to facilitate faster data throughput via a multi-path RDMA. In general, the multi-path local backplane 340 can utilize any available transport technology, and the multi-path bridge circuits incorporated in the plurality of processing and instrumentation nodes 302, 304, 306, 308, 310, 312, 314, 316, 318, 320, 322, 324, 326, 328, 330, and 332 are adapted to implement multi-path data communications and can leverage the available bandwidth to achieve higher data throughput.

In a particular example, a multi-path bridge circuit in conjunction with the passive, multi-path local backplane 340 provides an order-of-magnitude increase in data transfer throughput between the plurality of processing nodes 302, 304, 306, 308, 310, 312, 314, 316, 318, 320, 322, 324, 326, 328, 330, and 332 (computing nodes) and supports real-time or near-real-time parallel processing in multi-GSPS instrumentation systems.

In a particular embodiment, the instrumentation node (I-Node) 318 receives instrumentation data samples from a multiple Gigabit per second analog-to-digital converter (ADC). The instrumentation node 318 includes a multi-path bridge circuit, such as the multi-path bridge circuit 102 illustrated in FIG. 1, which is adapted to communicate the data samples directly to a memory associated with the processing node 302 via the multi-path local backplane 340 via a parallel, concurrent, multi-channel RDMA data transmission. In particular, the multi-path bridge circuit of the instrumentation node 318 transmits a first portion of the data via a direct interconnection between the instrumentation node 318 and the processing node 302. Additionally, the instrumentation node 318 uses all of its other interconnections to the other instrumentation nodes 312, 314, and 316 and to the other processing nodes 304, 306, 308, 310, 320, 322, 324, 326, 328, 330, and 332 to push other portions of the data to the other nodes 304, 306, 308, 310, 320, 322, 324, 326, 328, 330, and 332 for direct transmission of the other portions of the data from the other nodes 304, 306, 308, 310, 320, 322, 324, 326, 328, 330, and 332 to the memory of the processing node 302 via their respective direct connections. Each of the multiple channels is bolded to illustrate the data transmission from the instrumentation 318 to the processing 302 in parallel via different communication paths having different lengths. In a particular example, the data can also be sent to multiple processing nodes in parallel.

In a particular example, remote direct memory access (RDMA) over Internet Protocol (IP) differs from traditional TCP/IP (Transmission Control Protocol/IP) in that RDMA eliminates unnecessary buffering in the operating system (OS) when transmitting and receiving packets. Instead of copying packets into a buffer in the OS before sending or receiving, the multi-path bridge circuit takes data directly from application user-space memory, applies the appropriate network layer protocols and Ethernet link layer frame and sends the packet across the network. On the receiving end, another multi-path bridge circuit receives the packet and places the payload directly into application user-space memory. By removing the unnecessary data copying in the kernel and off-loading network protocol processing at both ends of the link, the multi-path bridge circuits alleviate the latency issues normally associated with TCP/IP and make Ethernet a viable solution for high-speed, low-latency instrumentation systems.

In general, the multi-path connectivity provided by the multi-path backplane 340 is leveraged by the multi-path bridge circuits to aggregate the bandwidth of each connection between a processing node and each of the other processing or instrumentation nodes. In a particular example, while a particular direct connection between any two nodes has a bandwidth of approximately 10 Gbps, data can be transferred via the multi-path backplane via multiple concurrent communication paths at an aggregate rate of 150 Gbps, using each available 10 Gbps channel. Further, an additional 10 or 20 Gbps can be added by transferring another portion through the external switch fabric. Thus, using the multi-path backplane 340, data throughput between processing nodes can be aggregated to improve data transfer rates significantly. In particular, relative to current networking technology, the multi-path RDMA technique implemented by the multi-path bridge circuit provides an order-of-magnitude increase in bandwidth between processing nodes in the same backplane and/or between processing nodes connected through a switch fabric across a network. Further, if the processing nodes are coupled through a dual redundant switch fabric (via a network device, such as a switch or router), an additional increase in data throughput can be realized.

Figure 4:
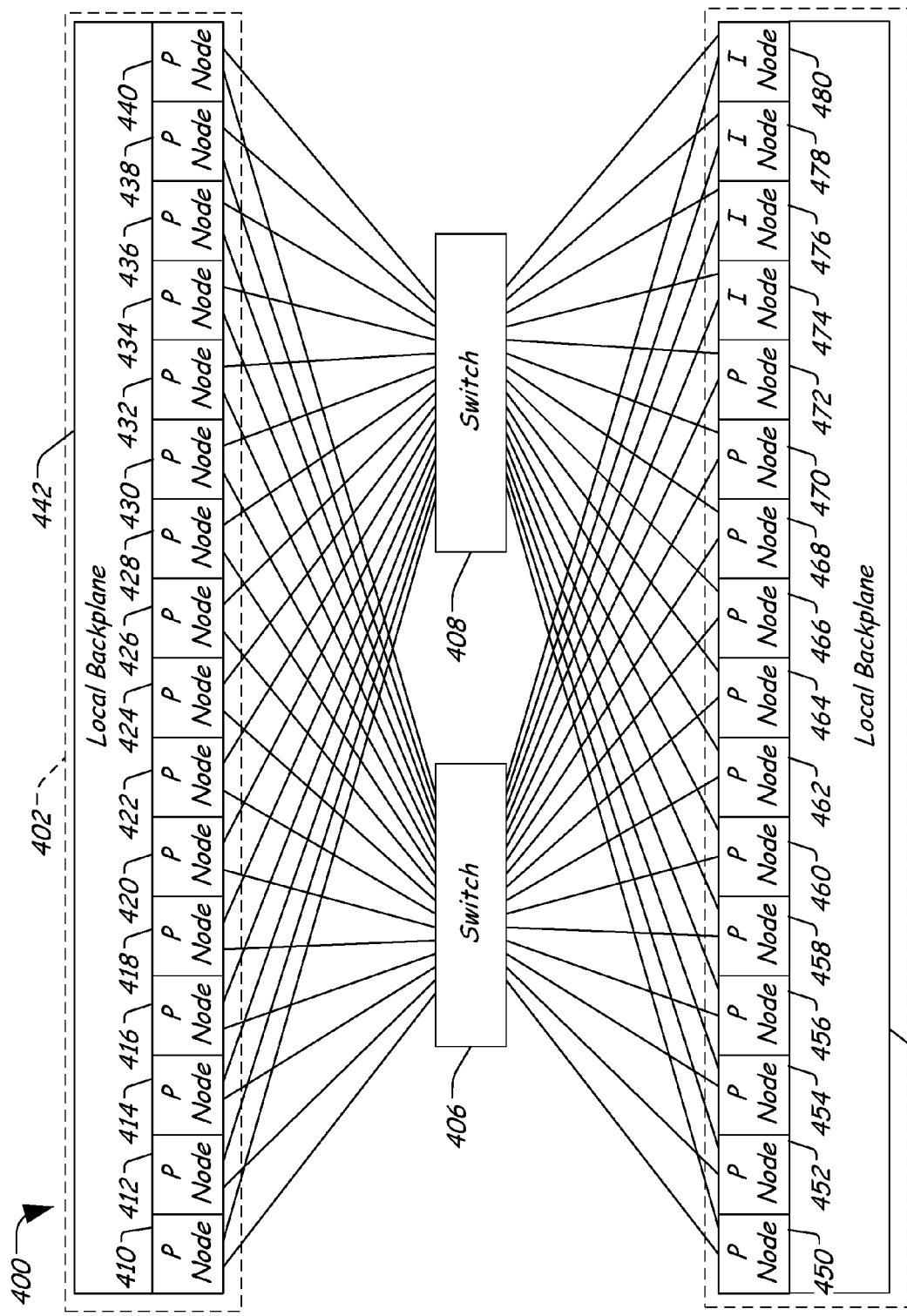
FIG. 4 is a block diagram of a particular illustrative embodiment of a system including a pair of electronic devices coupled by dual redundant switches, where each of the electronic devices includes a plurality of processing nodes with a corresponding plurality of multi-path bridge circuits to provide multi-path data communications.

FIG. 4 is a block diagram of a particular illustrative embodiment of a system 400 including a pair of electronic devices 402 and 404 coupled by dual redundant switches 406 and 408, where each of the electronic devices 402 and 404 includes a plurality of processing nodes with a corresponding plurality of multi-path bridge circuits to provide multi-path data communications. The first electronic device 402 includes a first plurality of processing nodes 410, 412, 414, 416, 418, 420, 422, 424, 426, 428, 430, 432, 434, 436, 438, and 440, which are fully interconnected by a first multi-path local backplane 442. The second electronic device 404 includes a second plurality of processing nodes 450, 452, 454, 456, 458, 460, 462, 464, 468, 470, 472, 474, 476, 478, and 480, which are fully interconnected by a second multi-path local backplane 482. Additionally, each of the first and second plurality of processing nodes 410, 412, 414, 416, 418, 420, 422, 424, 426, 428, 430, 432, 434, 436, 438, 440, 450, 452, 454, 456, 458, 460, 462, 464, 468, 470, 472, 474, 476, 478, and 480 includes two Ethernet connections, one Ethernet connection to each of the first and second switches 406 and 408.

In a particular embodiment, each of the first and second plurality of processing nodes 410, 412, 414, 416, 418, 420, 422, 424, 426, 428, 430, 432, 434, 436, 438, 440, 450, 452, 454, 456, 458, 460, 462, 464, 468, 470, 472, 474, 476, 478, and 480 includes logic to facilitate multi-path concurrent (parallel) data communications.

In a particular embodiment, a particular multi-path bridge circuit breaks (segments or divides) the data block into data block portions. A first portion of the data block is sent from the memory associated with the processing node 410 via the first switch 406 to the memory associated with the processing node 450. A second portion of the data block is sent from the memory associated with the processing node 410 via the second switch 408 to the memory associated with the processing node 450. A third portion of the data block is sent from the memory associated with the processing node 410 via the first multi-path local backplane 442 to a second processing node 412, which forwards the third portion to the memory associated with the processing node 450 via the first or second switch 406 or 408, the processing node 452, and the second multi-path local backplane 482. Further, other portions of the data block are transferred from the memory of the first processing node 410 via the first multi-path local backplane 442 to the other processing nodes 414 416, 418, 420, 422, 424, 426, 428, 430, 432, 434, 436, 438, 440, which transmit the other portions via the dual redundant switches 406 or 408 to the memory of the processing node 450 via the processing nodes 452, 454, 456, 458, 460, 462, 464, 468, 470, 472, 474, 476, 478, and 480 through the second multi-path local backplane 482.

In a particular example, if each connection from the plurality of processing nodes 410, 412, 414, 416, 418, 420, 422, 424, 426, 428, 430, 432, 434, 436, 438, 440, 450, 452, 454, 456, 458, 460, 462, 464, 468, 470, 472, 474, 476, 478, and 480 to the redundant switches 406 and 408 has a data rate of approximately 10 Gbps, then data can be transferred from the memory of the processing node 410 to the memory of the processing node 450 at an aggregate rate of approximately 170 Gbps. In general, the system 400 is adapted to exploit the first and second multi-path local backplanes 442 and 482 to transfer data between processing nodes and to utilize each of the channels through the switches 406 and 408 concurrently to achieve an aggregated data throughput that is greater than any one of the channels. In another particular example, where data quality is important, the system 400 may transmit redundant portions of the data block concurrently to a destination device to ensure data accuracy. In an example, if there are sixteen available communications paths between two devices, eight of the paths may be used to transmit different data block portions and another eight may be used to transmit redundant data block portions in parallel. Further, the system 400 can be adapted to utilize half of the channels for redundant transmission and half for accelerated (parallel) transmission to achieve a higher data throughput rate with enhanced quality of service. In general, the amount of bandwidth available to a particular transaction can be dynamically allocated across the available links. In a particular example where 15 communication paths are available through the local backplane, a particular transaction can dynamically allocate N of the 15 available links, where $1 \leq N \leq 15$.

In a particular embodiment, each of the first and second pluralities of processing nodes 410, 412, 414, 416, 418, 420, 422, 424, 426, 428, 430, 432, 434, 436, 438, 440, 450, 452, 454, 456, 458, 460, 462, 464, 468, 470, 472, 474, 476, 478, and 480 are mapped to a dual-redundant star topology (i.e., dual redundant switches 406 and 408). In general, each of the first and second switches 406 and 408 provides a switched connection between any two processing nodes in the system 400. On the other hand, the multi-path fabric of the first and second multi-path local backplanes 442 and 482 allows for each processing node to have as many connections as processing nodes in the backplane. Hence, the multi-path fabric of the first and second multi-path local backplanes 442 and 482 can be exploited to provide much higher bandwidth into and out of any one processing node than a single connection can provide.

In a particular example, each of the processing nodes has seventeen available channels to transmit data to any other processing node (the fifteen channels through the multi-path local backplanes 442 and 482 and two channels through the dual redundant switches 406 and 408. Any two processing nodes in the network have one direct channel through the multi-path local backplane 442 or 482 plus two switched connections between each other through the dual redundant switches 406 and 408. Using the multi-path RDMA, the two processors also gain fourteen one-hop connections through the remaining multi-path channels via the other fourteen nodes' multi-path bridge circuits. As used herein, the term "hop" refers to a link or communication path between processing nodes either through the backplane fabric or via a network switch fabric. The multi-path bridge circuits act as cut-through switches between the sending and receiving multi-path bridges on the source and destination nodes.

In a particular embodiment, the multi-path bridge circuit of a particular processing node, such as the processing node 410, segments the payload and transmits the resulting segments concurrently via the seventeen available channels. The two switch fabric ports simply send their packets to the Ethernet ports on the receive side of the first and second switches 406 and 408. The fifteen connections through the backplane interface 442, however, route through the other fifteen multi-path bridge circuits of the other fifteen processing nodes 412, 414, 416, 418, 420, 422, 424, 426, 428, 430, 432, 434, 436, 438 and 440, which act as cut-through (bypass or pass-through) switches, to the switch fabric ports on each node to transmit the data segments to the receive side of the first and second switches 406 and 408. In general, the packet segments are sent across the switch fabric simultaneously (or concurrently) to the fifteen nodes 452, 454, 456, 458, 460, 462, 464, 468, 470, 472, 474, 476, 478, and 480 connected to the receiving node 450 through the other multi-path local backplane 482. The multi-path bridge circuits on those nodes 452, 454, 456, 458, 460, 462, 464, 468, 470, 472, 474, 476, 478, and 480 then act as cut-through (bypass or pass-through) switches to the channels connected to the multi-path bridge circuit of the receiving node 450. The multi-path bridge on the receiving node 450 then combines the payloads from each packet and places the data directly into the memory of the receiving node 450. Hence, for a multi-path data transmission through the dual-redundant switch fabric, the processing node 410 has two one-hop switched connections and fifteen three-hop connections through the first and second multi-path local backplane interfaces 442 and 482 and through the respective multi-path bridges.

Figure 5:
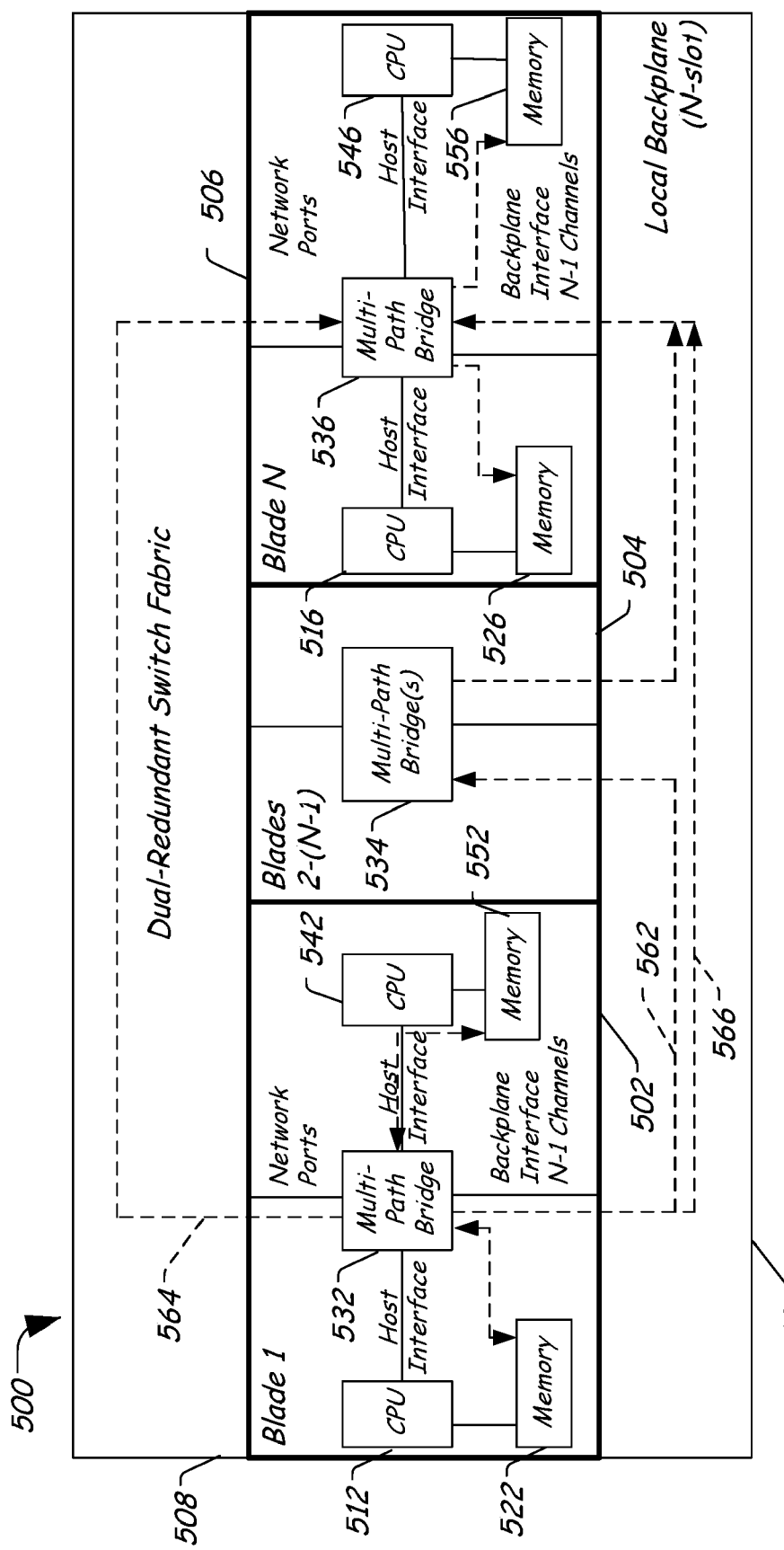
FIG. 5 is a block diagram of a particular illustrative embodiment of a system including multiple processing nodes, where each processing node includes a multi-path bridge circuit to provide multi-path data communications.

FIG. 5 is a block diagram of a particular illustrative embodiment of a system 500 including multiple processing nodes, where each processing node includes a multi-path bridge to provide multi-path data communication. The system 500 includes a first node 502, one or more additional nodes 504, and a last node 506, which are each coupled via dual Ethernet connections to a dual redundant switch fabric 508, such as a 10 Gigabit per second Ethernet switch fabric. Further, the first node 502, the one or more additional nodes 504, and the last node 506 are interconnected via a multi-path local backplane 510.

The first node 502 includes a processor (CPU) 512 that is coupled to a memory 522 and to a multi-path bridge circuit 532. The node 502 also includes a second processor 542 and a memory 552, which are coupled to the multi-path bridge circuit 532. The multi-path bridge circuit 532 includes logic and a physical connection to provide a multi-path data communication functionality to facilitate transfer of data between the first node 502, the one or more other nodes 504, and the last node 506. Additionally, the multi-path bridge circuit 532 is adapted to transmit data to or receive data from nodes of another electric device via the switch fabric 508. Each of the one or more additional nodes 504 includes a respective one or more multi-path bridge circuits 534 that includes logic and a physical connection to facilitate concurrent multi-path transfer of data between the first node 502, the one or more other nodes 504, and the last node 506 and/or between nodes of another electric device via the switch fabric 508. Further, the last node 506 includes a first processor 516 and a memory 526 that are coupled to a multi-path bridge circuit 536. Further, the multi-path bridge circuit 536 is coupled to the second processor 546 and a second memory 556. The multi-path bridge circuit 536 includes logic and physical connections to facilitate multi-path concurrent transfer of data between the first, second, and one or more other nodes 502, 504, and 506 and/or between nodes of another electric device via the switch fabric 508.

In general, the multi-path bridge circuits 532, 534 and 536 may be integrated circuit devices that include logic to exploit the multi-path local backplane 510 and the dual redundant switch connections via the switch fabric 508 to transmit data via multiple data paths having different lengths and in parallel. Further, in a particular embodiment, the multi-path bridge circuits 532, 534, and 536 can be integrated with a processor. For example, the multi-path bridge circuit 532 can be integrated with the CPU 512. In this example, the host interface can be a data bus internal to the CPU 512.

Figure 6:
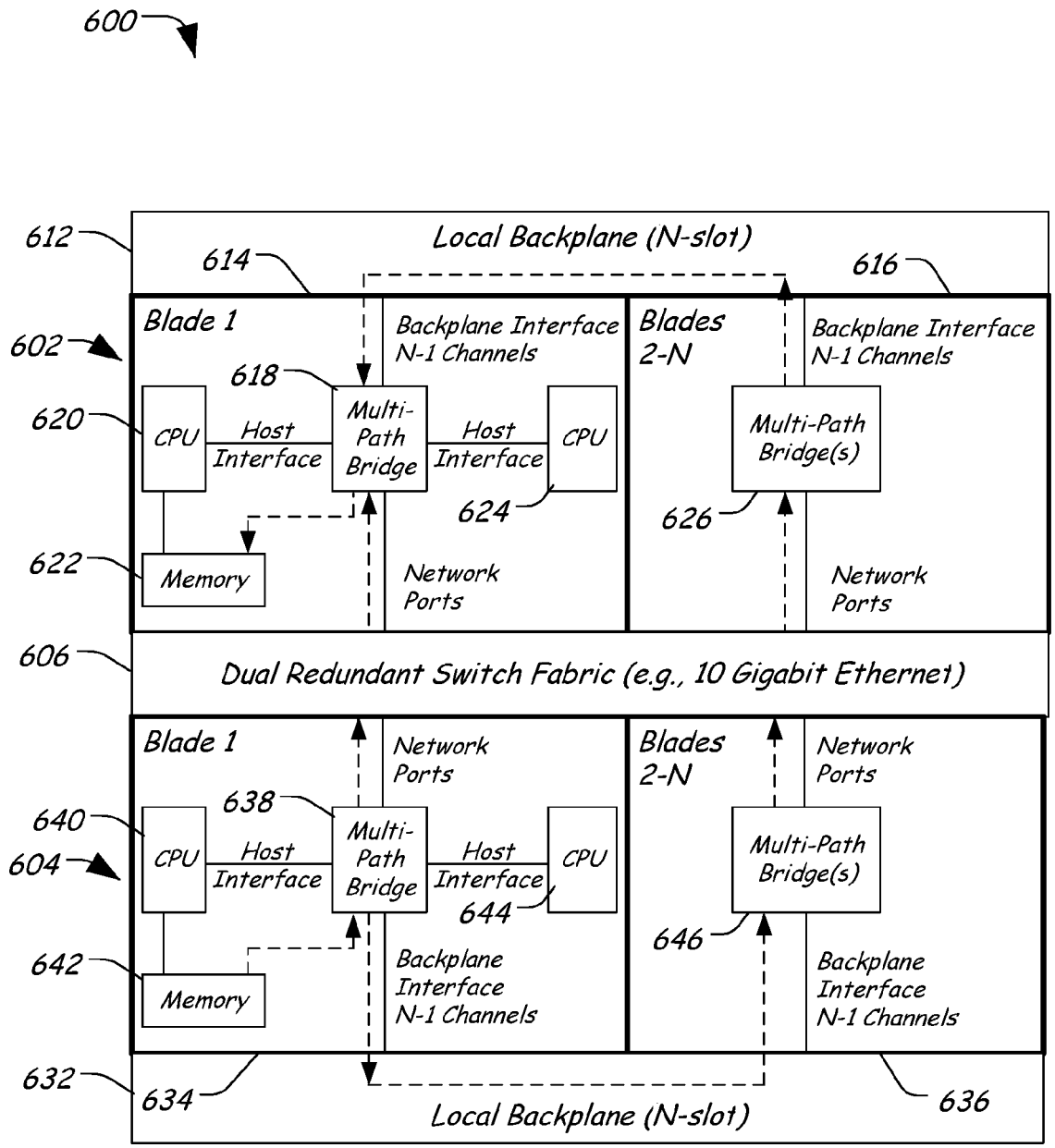
FIG. 6 is a block diagram of a another particular illustrative embodiment of a system including servers coupled by an Ethernet switch fabric, where each server includes multiple processing nodes and where each processing node has a multi-path bridge circuit to provide multi-path data communications.

FIG. 6 is a block diagram of a another particular illustrative embodiment of a system 600 including servers 602 and 604 coupled by an Ethernet switch fabric 606, where each server 602 and 604 includes multiple processing nodes and where each processing node has a multi-path bridge circuit to provide multi-path data communication. In a particular embodiment, the Ethernet switch fabric 606 is a 10 Gigabit Ethernet dual redundant switch fabric. The first node server 602 includes a plurality of processing nodes 614 and 616. The processing node 614 includes a processor 620 and a memory 622 that are coupled to a multi-path bridge circuit 618. The multi-path bridge circuit 618 is coupled to a second processor 624 and to a multi-path local backplane 612 and to the switch fabric 606. The multi-path bridge circuit 618 can be an integrated circuit that includes logic adapted to facilitate data transfers between the plurality of nodes 614 and 616 and between a single node and one or more nodes of the second node server 604. The node server 602 further includes one or more processing nodes 616, each of which include a multi-path bridge circuit 626 to facilitate multi-channel data transfers between the plurality of nodes 614 and 616, between a node 614 and a node of the second node server 604, or any combination thereof.

The second node server 604 includes a plurality of processing nodes 634 and 636. The processing node 634 includes a processor 640 and a memory 642 that are coupled to a multi-path bridge circuit 638. The multi-path bridge circuit 638 is coupled to a second processor 644 and to a multi-path local backplane 632 and to the switch fabric 606. The multi-path bridge circuit 638 can be an integrated circuit that includes logic adapted to facilitate data transfers between the plurality of nodes 634 and 636 and between a single node and one or more nodes of the first node server 602. The second node server 604 further includes one or more processing nodes 636, each of which includes a multi-path bridge circuit 646 to facilitate multi-channel parallel data transfers between the plurality of nodes 634 and 636, between a node 634 and a node of the first node server 602, or any combination thereof.

In general, the bandwidth between any two multi-path bridge circuits is a multiple of the Ethernet switch fabric speed. For dual redundant 10 Gbps connections, a sixteen node chassis can achieve up to a maximum 170 Gbps data throughput using the available communication paths. Further, the number of channels utilized by the multi-path bridge circuits can change on the fly, such that the number of communication paths between any two nodes is dynamic. As a result, multi-path bridge circuits, such as the multi-path bridge circuits 618, 626, 638, and 646, can support a large number of connections at dynamically changing bandwidths in order to optimize connections for a wide range of algorithms. Further, depending on Quality of Service (QoS) requirements, the number of channels utilized for the multi-path transfers can vary to provide redundant channels. For example, in a particular instance, redundant data segments may be transmitted in parallel via each of the blades and via the two switch fabric connections, achieving a redundant data transfer rate of approximately 80 Gbps. However, real-time or near-real-time systems can only take advantage of this enhanced data throughput if the instruments are able to obtain the same amount of bandwidth into and out of the parallel processing cluster.

Figure 7:
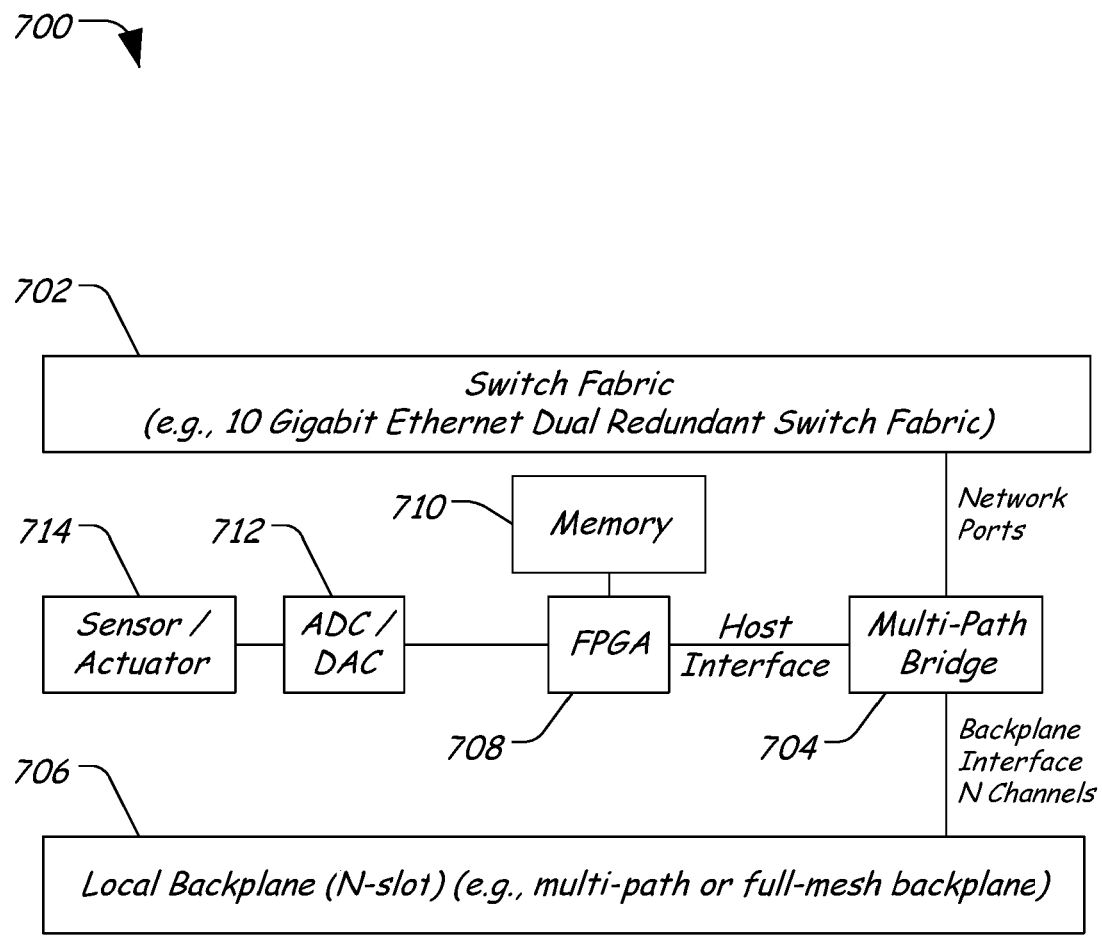
FIG. 7 is a block diagram of a particular illustrative embodiment of an system including an instrumentation node having multi-path bridge circuit to provide multi-path data communications.

FIG. 7 is a block diagram of a ninth particular illustrative embodiment of a portion of a system 700 including an instrumentation node having a multi-path bridge circuit to provide multi-path data communication. The system 700 includes a switch fabric 702, such as a 10 Gigabit Ethernet dual redundant switch fabric. The system 700 also includes a multi-path bridge circuit 704 to couple the switch fabric 702 to a multi-path local backplane 706, which may be coupled to any number of processing or instrumentation nodes. The system 700 also includes a field programmable gate array (FPGA) 708, which is a programmable logic chip that is coupled to or contains the multi-path bridge circuit 704. In a particular embodiment, the multi-path bridge circuit 704 can be integrated into the FPGA 708. The system 700 further includes a memory 710 that is coupled to the FPGA 708, an analog-to-digital converter (ADC)/digital-to-analog converter (DAC) 712 that is coupled to the FPGA 708, and a sensor/actuator 714 that is coupled to the ADC/DAC 712. In a particular embodiment, the ADC/DAC 712 is adapted to source or sink high-bandwidth data streams at multiple Giga-sample per second (GSPS) data rates to and from the sensor/actuator 714.

In a particular example, the sensor/actuator 714 is adapted to provide a signal to the ADC/DAC 712 that is related to a measured parameter, such as a position, a temperature, a flow rate, other data, or any combination thereof. The ADC/DAC 712 converts the signal into a digital signal that is provided to the FPGA 708, which can store the data at the memory 710 and which can transmit the data to one or more other nodes or across a network fabric via the multi-path bridge circuit 704. In an alternative example, the sensor/actuator 714 can receive a signal from the ADC/DAC 712 to adjust the sensor/actuator 714. For example, if the sensor/actuator 714 is adapted to adjust a valve, a valve adjustment signal can be received via the ADC/DAC 712.

In another particular embodiment, the system 700 can include dual 10-Gbps RDMA over Internet Protocol (IP) Ethernet ports. In this embodiment, using multi-path RDMA, the multi-path bridge circuit 704 can transfer data directly between its own memory and tens, hundreds or even thousands of processor memories in a supercomputing cluster through an Ethernet switch fabric at very high data throughput rates, allowing for real-time or near real-time analysis of measurement data.

In another particular embodiment, the ADC/DAC 712 can be interfaced to the multi-path local backplane 706 using the FPGA 708 to communicate with the ADC/DAC 712, to buffer data in memory 710, and to provide a host interface to the multi-path bridge circuit 704. The multi-path bridge circuit 704 can use multi-path RDMA to transfer data between the memory 710 and the memory of any processor in the cluster. Furthermore, with Institute of Electrical and Electronics Engineers (IEEE) 1588 Precision Time Protocol (PTP) support built into the multi-path bridge, the system 700 can support clock time synchronization with each of the processing nodes.

In a particular example, the system 700 can be used with a cluster of processing nodes using multi-path RDMA to compute a billion-point complex Fast Fourier Transform (CFFT) of acquired sensor data in near real-time. For example, using two 8-bit 5 Giga-sample per second (GSPS) ADCs to capture an arbitrary waveform starting at time zero (t=0) on the system 700 that is connected to the multi-path local backplane 706. The two ADCs sample the waveform in-phase and quadrature-phase (I and Q). A billion complex data points are sampled every 214.7 ms (a billion in this case is actually $2^{30}$). The data rate corresponds to a bandwidth of 10 GBps from the two ADCs. Since the ADC interface and the DDR3 synchronous dynamic random access memory (SDRAM) interface on the FPGA have more than 10 GBps bandwidth, the data points can be stored in the memory 710 as fast as they are sampled.

As the data is stored in memory 710, the FPGA 708 simultaneously has the multi-path bridge circuit 704 transport the data to a processor somewhere in the cluster using multi-path data communications, such as multi-path RDMA. Since the host interface and the network bandwidth to a processor through the multi-path bridge circuit 704 using multi-path data communications can be much greater than the sampling rate of the ADC 712, the data can be streamed to the processor's memory as the ADC 712 samples the waveform.

In a particular example, the processor that receives the data via the multi-path RDMA data transfer can be an IBM Cell Broadband Engine processor, a multi-core heterogeneous processor with one PowerPC Processor Element (PPE) and eight Synergistic Processor Elements (SPEs). To perform a near-real-time billion-point CFFT on the IBM Cell, the processor must have both enough memory to support the large data set and a significant amount of computational power to perform the calculations in a small amount of time. A billion-point single-precision floating-point CFFT requires eight bytes of storage per single-precision floating point complex data point and thus needs 8 GB of memory for storage. In this example, with 230 GFLOPS single-precision floating point performance, the Cell can perform a 16M-point CFFT in 0.043 s, which can be scaled to estimate the time required to calculate a billion-point CFFT. The first part of the calculation involves determining the relative complexity factor of a billion-point CFFT to a 16M-point CFFT. The complexity of a CFFT is determined by the following equation:

$$N \log_2(N) \qquad \text{Equation 1,}$$

where N is the number of points. Hence, the complexity factor of a billion-point CFFT compared to a 16M-point CFFT is as follows:

$$[1B \log_2(1B)]/[16M \log_2(16M)] = 80 \qquad \text{Equation 2.}$$

Assuming the billion-point CFFT is as equally parallelizable on a single Cell as the 16M-point CFFT, the time a Cell takes to calculate a billion-point CFFT is determined by the following equation:

$$80 * 0.043 \text{ s} = 3.44 \text{ seconds} \qquad \text{Equation 3.}$$

The ADCs 712 can sample one billion complex data points in 214.7 ms. Using only sixteen Cells, the multi-path RDMA Instrumentation System 700 can perform billion-point CFFTs continuously in near real-time. Further, a multi-path RDMA Instrumentation system 700 with one instrumentation module and nine Cell nodes containing eighteen Cells is able to compute a billion-point CFFT on a 5 GSPS complex signal in near-real-time. In general, while a 5 GSPS complex ADC signal represents an extreme example, the multi-path data communication supported by the multi-path bridge circuit 704 in conjunction with the switch fabric 702 and the multi-path local backplane 706 makes such near real-time calculations possible.

Figure 8:
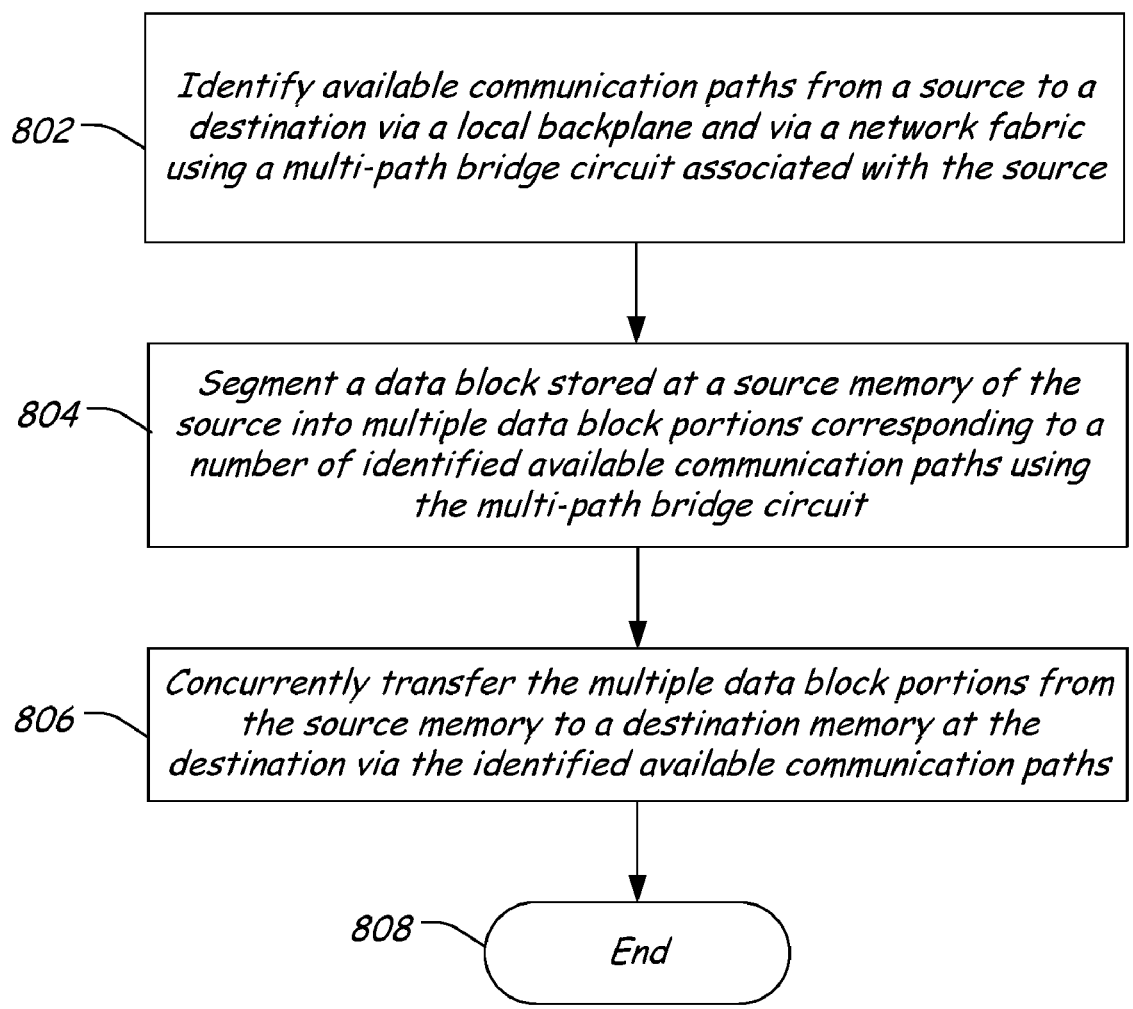
FIG. 8 is a flow diagram of a particular illustrative embodiment of a method of providing multi-path data communications.

FIG. 8 is a flow diagram of a particular illustrative embodiment of a method of providing multi-path data communications. At 802, available communication paths for data transfer from a source memory to a destination memory are identified, where the identified I/O interfaces including at least one backplane I/O interface and at least one network I/O interface. Advancing to 804, a data block stored at the source memory of a source node of an electronic device is segmented into multiple data block portions corresponding to a number of identified input/output (I/O) interfaces. Continuing to 806, the multiple data block portions are concurrently transferred from the source memory to a destination memory at the destination via the identified available communication paths. In a particular embodiment, each data block portion of the multiple data block portions is transmitted via a selected I/O interface associated with at least one of the identified available communication paths. In a particular embodiment, each of the identified available communication paths has a particular data rate, and a data rate associated with transmission of the data block to the selected memory is related to a sum of data rates associated with the identified available communication paths. The method terminates at 808.

In a particular embodiment, each of the available communication paths has a different path length. In another particular embodiment, each of the available communication paths has a unique path length. In still another particular embodiment, the method further includes receiving multiple second data block portions at network I/O interfaces of the plurality of processing nodes, each of the multiple second data block portions including a memory base address and an address offset. In this instance, the method also includes transferring data to a particular memory according to the memory address and the address offset via the multi-path backplane to assemble a received data block from the multiple second data block portions.

In another particular example, the method includes receiving multiple second data block portions from multiple sources via multiple communication paths at the multi-path bridge circuit of the source, determining a memory location within the source memory for each of the multiple second data block portions, and storing the multiple second data block portions at the determined memory locations. In still another particular embodiment, the method includes receiving a third data block portion from at least one source via at least one communication path, determining a destination address associated with the received third data block portion, and forwarding the received third data block portion to the destination via the local backplane based on the determined destination address. In a particular example, the destination address represents an application process executing at a processor associated with the destination. In another particular example, the destination address represents a memory location (memory base address and an address offset). In a particular embodiment, the destination can include one or more processing nodes, one or more instrumentation nodes, or any combination thereof.

Figure 9:
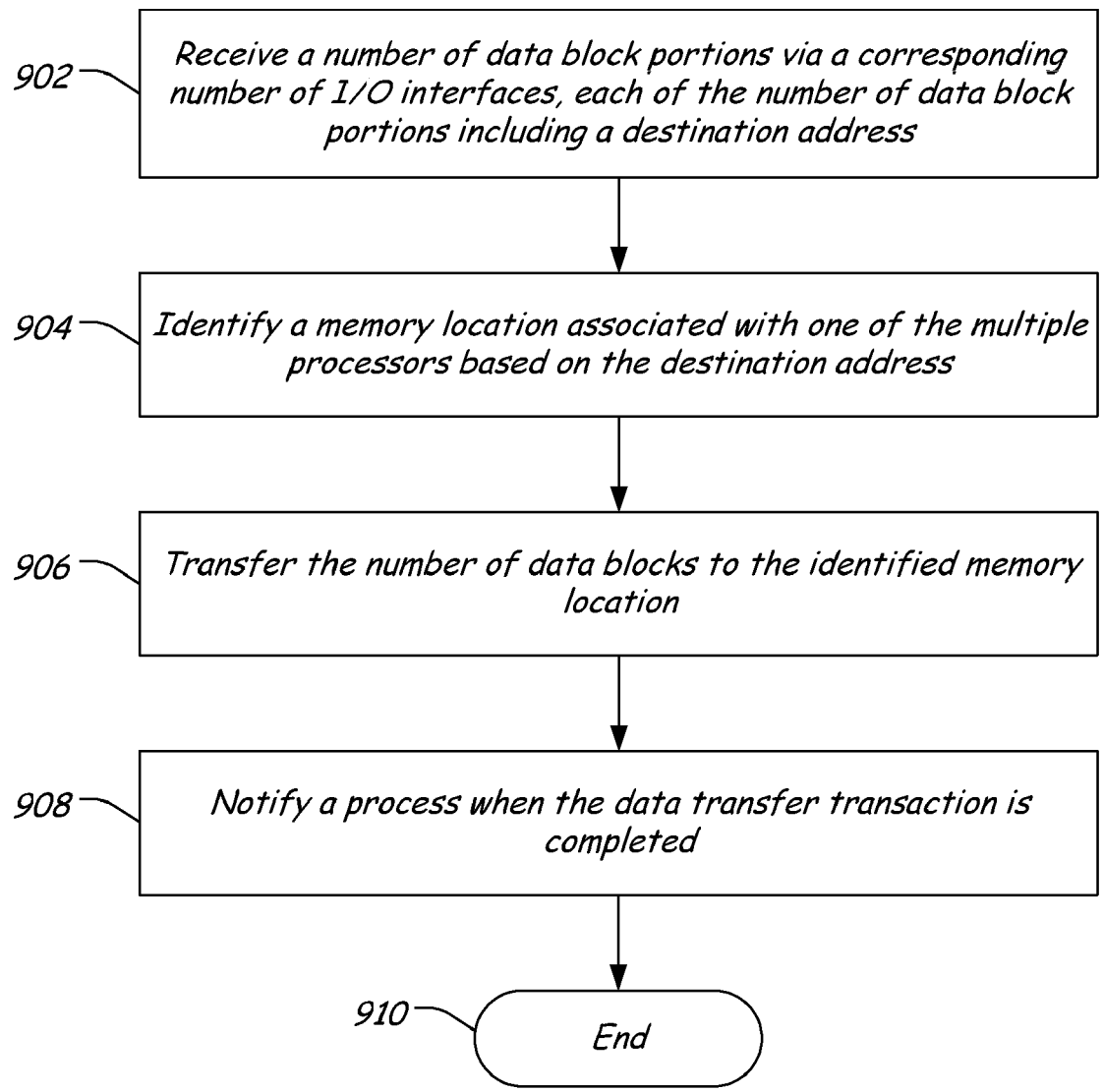
FIG. 9 is a flow diagram of a second particular illustrative embodiment of a method of providing multi-path data communications.

FIG. 9 is a flow diagram of a second particular illustrative embodiment of a method of providing multi-path data communications. At 902, a number of data block portions are received via a corresponding number of input/output (I/O) interfaces, where each of the number of data block portions includes a destination address. In a particular embodiment, the destination address can be a memory address, such as a memory base address and an address offset. In another particular embodiment, the destination address can be a network identifier, a media access control (MAC) address, another identifier, or any combination thereof. Moving to 904, a memory location associated with one of the multiple processors is identified based on the destination address. Continuing to 906, the number of data blocks is transferred to the identified memory location. Proceeding to 908, a process is notified when the data transfer transaction is completed. In a particular embodiment, blocks 902-906 may be repeated until a data transfer process is complete. In another particular embodiment, the process can be an application executing at a processing node, a process thread, an interrupt, or any combination thereof. The method terminates at 910.

Figure 10:
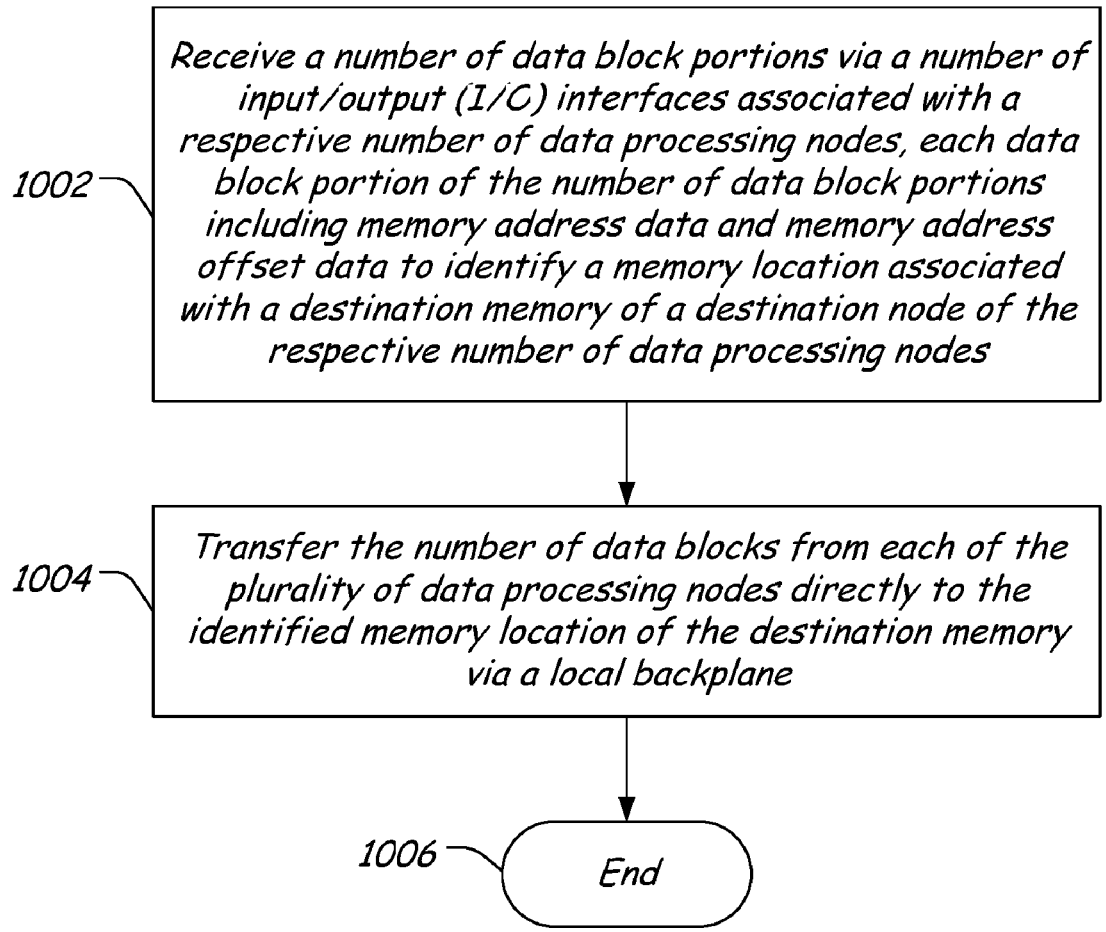
FIG. 10 is a flow diagram of a third particular illustrative embodiment of a method of providing multi-path data communications.

FIG. 10 is a block diagram of a third particular embodiment of a method of providing multi-path data communications. At 1002, a number of data block portions are received via a number of input/output (I/O) interfaces associated with a respective number of data processing nodes, where each data block portion of the number of data block portions includes a destination address. Advancing to 1004, the number of data blocks is transferred from each of the plurality of data processing nodes directly to a memory location directly or via a multi-path backplane based on the destination address. In a particular example, the method returns to 1002 and a second number of data block portions are received and the method is repeated. In another particular example, blocks 1002 and 1004 may be iteratively repeated until a data transfer process is complete. In another particular example, the destination address can include at least one of a network identifier, a memory base address, and a memory address offset. The method terminates at 1006.

In conjunction with the systems and methods described above, a multi-path bridge circuit is disclosed that enables multi-path data communications to facilitate high throughput data transfers via a local backplane and optionally through a network switch fabric. Further, the multi-path bridge circuit can be used in both processing and instrumentation nodes to facilitate real-time or near-real time data collection and processing using distributed processing systems. Additionally, the multi-path bridge circuit enables multi-path data communications to transfer data concurrently (or near simultaneously) via multiple data paths having different lengths, different data rates, different topologies, or any combination thereof, to achieve a network throughput that is related to an aggregate data throughput of the multiple paths. In a particular embodiment, a multi-path bridge circuit is adapted to exploit a multi-path local backplane and multiple I/O interfaces to achieve an order-of-magnitude increase in bandwidth and/or data throughput between nodes of a system.

Although the present invention has been described with reference to preferred embodiments, workers skilled in the art will recognize that changes may be made in form and detail without departing from the spirit and scope of the invention.

What is claimed is:

1. A multi-path bridge circuit comprising:
    a backplane input/output (I/O) interface to couple to a first slot of multiple slots of a local backplane, each slot of the multiple slots including a plurality of channels, each channel supporting, bi-directional communication between two of the multiple slots, the plurality of channels including at least one channel between a processing node at the first slot and a destination node at a second slot of the multiple slots; and
    logic adapted to identify available channels through the local backplane to a second slot of the multiple slots corresponding to a destination node, the available channels including at least one channel from the first slot to a third slot and from the third slot to the second slot, the logic configure to divide a data block into a number of data block portions corresponding to a number of the available channels and to transfer the data block portions in parallel to the destination node through the available channels.

2. The multi-path bridge circuit of claim 1, further comprising:
    at least one host interface adapted to couple to a corresponding at least one processor;
    wherein the logic is integrated with the at least one processor; and
    wherein the at least one host interface comprises a connection to a data bus that is internal to the at least one processor.

3. The multi-path bridge circuit of claim 1, further comprising a network input/output (I/O) interface to couple to a network, wherein the logic is adapted to identify at least one network communication path to the destination node via the network and is adapted to transfer at least one of the data block portions to the destination node via the at least one network communication path.

4. The multi-path bridge circuit of claim 3, wherein the destination node comprises at least one of a destination process and a destination processor.

5. The multi-path bridge circuit of claim 3, wherein the destination node is associated with a remote device coupled to the multi-path bridge circuit via the network.

6. The multi-path bridge circuit of claim 1, further comprising an instrumentation input/output interface adapted to receive data from and provide data to at least one of a sensor and an actuator, wherein the logic is adapted to send data to and to receive data from multiple nodes via the local backplane.

7. The multi-path bridge circuit of claim 1, wherein the logic is adapted to route a received data block portion to the destination node based on a destination address associated with the received data block portion.

8. An apparatus comprising:
    a local backplane including multiple slots, each slot including multiple channels, each of the multiple channels to connect the slot to another slot of the multiple slots; and
    a plurality of multi-path bridge circuits, each multi-path bridge circuit of the plurality of multi-path bridge circuits coupled to one of the multiple slots and communicatively interconnected via the multiple channels through the local backplane, each multi-path bridge circuit of the plurality of multi-path bridge circuits adapted to identify and utilize available channels of the multiple channels through the local backplane to transfer data in parallel from a source to a destination through others of the plurality of multi-path bridge circuits, the source and the destination coupled to the local backplane through first and second multi-path bridge circuits, respectively, of the plurality, of multi-path bridge circuits.

9. The circuit device of claim 8, further comprising a plurality of network input/output (I/O) interfaces coupled to a network fabric, wherein each multi-path bridge circuit of the plurality of multi-path bridge circuits is coupled to a respective network I/O interface of the plurality of network I/O interfaces.

10. The circuit device of claim 9, wherein each multi-path bridge circuit of the plurality of multi-path bridge circuits is adapted to identify at least one available communication path through the network fabric to the destination and to utilize the at least one available communication path to transfer at least a portion of the data to the destination via the network fabric.

11. The circuit device of claim 8, wherein each multi-path bridge circuit of the plurality of multi-path bridge circuits includes segmentation logic adapted to divide a data block into data block portions corresponding to a number of the available channels and to selectively transmit the data block portions in parallel via the available channels to the destination.

12. The circuit device of claim 8, wherein the destination comprises an application process executing at a processor.

13. The circuit device of claim 8, wherein the destination comprises a memory location of a destination memory.

14. The circuit device of claim 8, wherein each multi-path bridge circuit of the plurality of multi-path bridge circuits includes a host interface responsive to at least one of a processor, a field programmable gate array (FPGA) circuit, and a logic circuit.

15. The circuit device of claim 8, wherein at least one multi-path bridge circuit of the plurality of multi-path bridge circuits is coupled to at least one of a sensor, an actuator, and a transducer.

16. The circuit device of claim 15, wherein the at least of the plurality of one multi-path bridge circuits is adapted to transmit data to one or more destinations in parallel via the available channels.

17. The circuit device of claim 8, wherein the second multi-path bridge circuit is adapted to receive portions of the data from a plurality of available channels.

18. The circuit device of claim 8, wherein each multi-path bridge circuit of the plurality of multi-path bridge circuits includes input/output (I/O) routing logic adapted to identify one or more available channels for transferring the data.

19. A method comprising:
identifying available communication paths for transmitting a data block from a source to a destination through multiple channels through a local backplane and optionally via a communication path through a network fabric using a multi-path bridge circuit associated with the source, at least one of the multiple channels including a first portion from the multi-path bridge circuit to a second multi-path bridge circuit coupled to the local backplane and a second portion from the second multi-path bridge circuit to the destination;
segmenting the data block stored at a source memory of the source into multiple data block portions corresponding to a number of the identified available communication paths using the multi-path bridge circuit; and
concurrently transferring the multiple data block portions from the source memory to a destination memory at the destination via the identified available communication paths.

20. The method of claim 19, wherein the identified available paths have different path lengths.

21. The method of claim 19, further comprising:
receiving multiple second data block portions from multiple sources via multiple communication paths at the multi-path bridge circuit of the source;
determining a memory location within the source memory for each of the multiple second data block portions; and
storing the multiple second data block portions at the determined memory locations.

22. The method of claim 19, further comprising:
receiving a third data block portion from at least one source via at least one communication path;
determining a destination address associated with the received third data block portion; and
forwarding the received third data block portion to the destination via the local backplane based on the determined destination address.

23. The method of claim 19, wherein the destination comprises an application process executing at a processor associated with the destination.

24. The method of claim 19, wherein the destination comprises one or more processing nodes, one or more instrumentation nodes, or any combination thereof.

25. The method of claim 19, wherein the available communication paths include at least one communication path through the network fabric and at least one communication path through the local backplane.

26. The method of claim 25, wherein the source includes a first multi-path bridge circuit;
wherein the destination includes a second multi-path bridge circuit; and
wherein the first and second multi-path bridge circuits are connected to the local backplane.

27. The method of claim 19, wherein identifying the available communication paths comprises:
identifying a direct communication path from the source to the destination; and
identifying one or more indirect communication paths to communicatively couple the source to the destination, each of the one or more indirect communication paths including a first communication path from the source to an intermediate destination and from the intermediate destination to the destination.

* * * * *